(12) United States Patent
Engbom (10) Patent No.: US 11,746,686 B2
(45) Date of Patent: Sep. 5, 2023

(54) METHOD OF DIAGNOSING AN ENGINE SYSTEM (71) Applicant: VOLVO TRUCK CORPORATION, Gothenburg (SE)

(72) Inventor: Johan Engbom, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/158,757

(22) Filed: Jan. 24, 2023

(65) Prior Publication Data
US 2023/0235692 A1 Jul. 27, 2023

(30) Foreign Application Priority Data
Jan. 26, 2022 (EP) ..................................... 22153398

(51) Int. Cl.
*F01N 11/00* (2006.01)
(52) U.S. Cl.
CPC .......... *F01N 11/00* (2013.01); *F01N 2550/00* (2013.01); *F01N 2900/0601* (2013.01); *F01N 2900/1621* (2013.01)
(58) Field of Classification Search
CPC ................. F01N 11/00; F01N 2550/00; F01N 2900/0601; F01N 2900/1621; F01N 2900/06
See application file for complete search history.

(56) References Cited

U.S. PATENT DOCUMENTS

| 2007/0095050 A1 | 5/2007 | Asano |
| 2020/0034912 A1* | 1/2020 | Glasgow ............ G06Q 30/0601 |
| 2022/0010743 A1 | 1/2022 | Das et al. |

FOREIGN PATENT DOCUMENTS

WO 2021061603 A1 4/2021

OTHER PUBLICATIONS

Extended European Search Report in corresponding European Application No. 22153398.7 dated Jul. 12, 2022 (8 pages).

* cited by examiner

*Primary Examiner* — Jacob M Amick
(74) *Attorney, Agent, or Firm* — Venable LLP; Jeffri A. Kaminski (57) ABSTRACT

A method of diagnosing an engine system including an engine and an exhaust aftertreatment system. The engine system comprises a plurality of replaceable engine system components. The method comprises maintaining a database with component data comprising, for each one of the replaceable engine system components, a deterioration efficiency parameter correlating the deterioration status of the replaceable engine system component to emission reducing efficiency, and a utility component parameter comprising component exchangeability data; determining the deterioration status of each one of the replaceable engine system components; estimating the emission reducing efficiency for each one of the replaceable engine system components in response to the determined deterioration status and the deterioration efficiency parameter; based on known relation between component exchangeability data and the resulting emission reducing efficiency of a potential exchange of the replaceable engine system component, identifying a replaceable engine system component to exchange.

15 Claims, 3 Drawing Sheets

METHOD OF DIAGNOSING AN ENGINE SYSTEM

TECHNICAL FIELD

The present invention relates to a method of diagnosing an engine system comprising an engine and an exhaust aftertreatment system for reducing emissions of the exhaust gases from the engine, the engine system comprising a plurality of replaceable engine system components. The invention further relates to a computer program, and a computer readable medium carrying a computer program, the computer program comprising program code means for performing the method, a controlling apparatus for diagnosing an engine system, and to a vehicle.

The invention may be applied in any engine system that comprises an exhaust aftertreatment system for reducing emission from an engine. In particular, the invention can be applied in heavy-duty vehicles, such as trucks, buses and construction equipment. Although the invention will be described with respect to a hybrid heavy-duty truck, the invention is not restricted to this particular vehicle, but may also be used in other vehicles such as buses, trailers, wheel loaders, excavators, passenger cars, vessels, ships, etc. It is applicable in hybrid operated vehicles as well as in vehicles operated solely by an engine or combustion engine.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine.

In case the engine is a combustion engine, such as e.g. a diesel engine, it is common to provide the vehicle with an exhaust aftertreatment system, EATS, to handle emissions from the engine. An EATS for a diesel engine typically includes one or more of the following components: a diesel oxidation catalyst, DOC, a diesel particulate filter, DPF, and a selective catalytic reduction SCR catalyst. A reductant, such as urea or an ammonia comprising substance, is typically injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leave the EATS and the vehicle through the tailpipe of the vehicle. Other types of engines causing at least partly similar emissions as the diesel engine may utilize the same, or a similar, EATS.

Government regulations, together with a constant demand for increased fuel economy of the vehicle, implies a need for a more efficient operation of the EATS. However, the components of the engine and/or the EATS, commonly referred to as an engine system, are over time subject to deterioration resulting in a reduced emission reducing efficiency of the engine system. Exchange of the components of the engine system is often costly, complex, and/or time consuming.

There is thus a need in the industry for an improved diagnosis of the engine system.

SUMMARY

It is an object of the present invention to at least to some extent improve the diagnosis of the engine system.

According to at least a first aspect of the present invention, a method of diagnosing an engine system comprising an engine and an exhaust aftertreatment system for reducing emissions of the exhaust gases from the engine, the engine system comprising a plurality of replaceable engine system components, is provided. The method comprises:

maintaining a database with component data, the component data comprising, for each one of the replaceable engine system components, a deterioration efficiency parameter correlating the deterioration status of the replaceable engine system component to emission reducing efficiency, and a utility component parameter comprising component exchangeability data;

determining the deterioration status of each one of the replaceable engine system components;

estimating the emission reducing efficiency for each one of the replaceable engine system components in response to the determined deterioration status and the deterioration efficiency parameter; and based on known relation between component exchangeability data and the resulting emission reducing efficiency of a potential exchange of the replaceable engine system component, identifying a replaceable engine system component to exchange.

Hereby, an efficient diagnosing method of an engine system is provided. Thus, the exchange of at least one replaceable engine system component out of a plurality of replaceable engine system components may be determined with regards to the deterioration efficiency parameter and the utility component parameter for each one of the replaceable engine system components. That is, the exchange of the replaceable engine system component out of a plurality of replaceable engine system components which results in the most desired modification of the engine system (i.e. in response to the known relation between component exchangeability data and the resulting emission reducing efficiency) may be identified in an efficient manner. The resulting emission reducing efficiency for each one of the replaceable engine system components is e.g. defined as the difference in emission reducing efficiency between its current state (i.e. with its determined deterioration status) and if exchanged (i.e. with no deterioration). Thus, for each one of the replaceable engine system components, a known relation between the component exchangeability data and the resulting emission reducing efficiency (if exchanged) is provided, and by comparing a potential exchange of each one of the replaceable engine system components, the replaceable engine system component to exchange leading to the most desired modification of the engine system can be identified. For example, for a given component exchangeability data, the exchange of the replaceable engine system component resulting in the highest overall emission reducing efficiency can be identified by the method. The deterioration efficiency parameter and the utility component parameter are typically predetermined component parameters. The utility component parameter may be referred to as a replacement indicative parameter or exchangeability indicative parameter. The engine is typically an internal combustion engine, such as a diesel engine or hydrogen engine.

The deterioration efficiency parameter correlating the deterioration status of the replaceable engine system component to the emission reducing efficiency, may e.g. be based on a known correlation of the deterioration status and the emission reducing efficiency for each one of the replaceable engine system components. Typically, a worse deterioration status is linked to a low emission reducing efficiency. The deterioration status may e.g. be defined on a scale from 1/5 to 5/5 where 1/5 is representing the worse deterioration status and 5/5 is representing no deterioration (e.g. a state associated with a newly exchanged replaceable engine system component). The deterioration efficiency parameter may be determined in response to usage history, wear pattern, premature failure indicators, known quality problems, and more for the corresponding replaceable engine system components. According to another example, the deterioration efficiency parameter is at least partly determined in response to a sensor measurement for the corresponding replaceable engine system component. That is, the sensor measurement may provide a signal indicative of the deterioration status of the corresponding replaceable engine system component.

The known relation between component exchangeability data and the resulting emission reducing efficiency of a potential exchange of the replaceable engine system component may e.g. be compared to the emission reducing efficiency of the engine system, referred to as an overall emission reducing efficiency. Thus, a potential exchange of each one the replaceable engine system components, and the known relation between component exchangeability data and the resulting emission reducing efficiency of such exchange, may be used to evaluate the effect of the overall emission reducing efficiency of the engine system and the resulting effect of the component exchangeability data.

For example, the influence on the overall emission reducing efficiency of the engine system of each one of the replaceable engine system components is estimated based on determined deterioration status and the deterioration efficiency parameter. By then relating the component exchangeability data to the resulting emission reducing efficiency of a potential exchange for each one of the replaceable engine system components, the exchange of the replaceable engine system component(s) resulting in the most desirable combination of resulting effect associated with the component exchangeability data, and overall emission reducing efficiency, may be identified. For example, the method may loop through all potential exchange of the replaceable engine system components. After an exchange of a replaceable engine system component, the information and resulting effect of such exchange may be sent to the database for updating the component data.

It should be understood that that the diagnosis method of the invention is based on the analysis of a plurality of replaceable engine system components of the engine system, and the identification of exchange of at least one replaceable engine system component out of said plurality of replaceable engine system components. However, the exchange of one replaceable engine system component may be compared to the exchange of a plurality (e.g. two) other replaceable engine system components. Thus, the identification of a replaceable engine system component to exchange may include identifying at least two replaceable engine system components to exchange.

According to at least one example embodiment, the emission reducing efficiency is associated with the corresponding replaceable engine system component. That is, for each one of the replaceable engine system components there is an associated emission reducing efficiency related to said replaceable engine system component. Hereby the overall emission reducing efficiency of the engine system may be the result of the emission reducing efficiency of the sum of the replaceable engine system components of the engine system. Thus, the emission reducing efficiency of each one of the replaceable engine system components may be seen as a contribution to the overall emission reducing efficiency. As an alternative, the deterioration status of each one the replaceable engine system components is directly related to the emission reducing efficiency of the engine system (i.e. the overall emission reducing efficiency). Hereby, a potential exchange of each one the replaceable engine system components may be related to how such potential exchange effects the overall emission reducing efficiency. Thus, the identification of the replaceable engine system component to exchange may be based on a known relation between component exchangeability data and the overall emission reducing efficiency.

According to at least one example embodiment, the component exchangeability data includes costs associated with exchanging the corresponding replaceable engine system component.

Thus, the exchange of the replaceable engine system component out of a plurality of replaceable engine system components which results in the most cost-efficient modifications of the engine system in relation to the overall emission reducing efficiency of the engine system may be identified in an efficient manner. Typically, the most cost-efficient exchange of the replaceable engine system components leading to the highest overall emission reducing efficiency of the engine system may be identified.

The cost may e.g. comprise the component cost of the corresponding replaceable engine system component. Additionally, or alternatively, the cost may comprise the cost associated with the time and skills needed for exchanging the corresponding replaceable engine system component. That is, the component exchangeability data may comprise the component cost for each one of the replaceable engine system components, and/or the cost associated with the time and skills needed for exchanging each one of the replaceable engine system components. Stated differently, the replaceable engine system component may be identified based on a known relation between costs associated with exchanging the replaceable engine system components and the resulting emission reducing efficiency of a potential exchange of each one of the replaceable engine system components, and the corresponding effect on the overall emission reducing efficiency.

According to at least one example embodiment, the component exchangeability data includes the downtime of exchanging the corresponding replaceable engine system component.

Thus, the exchange of the replaceable engine system component out of a plurality of replaceable engine system components which results in the most time-efficient modifications of the engine system in relation to the overall emission reducing efficiency of the engine system may be identified in an efficient manner. Typically, the most time-efficient exchange of the replaceable engine system components leading to the highest overall emission reducing efficiency of the engine system may be identified. Stated differently, the replaceable engine system component is identified based on a known relation between downtime for exchanging the replaceable engine system components and the resulting emission reducing efficiency of a potential exchange of each one of the replaceable engine system components, and the corresponding effect on the overall emission reducing efficiency.

The downtime of exchanging one of the replaceable engine system components may be defined as the time which the engine system is down while the corresponding replaceable engine system component is exchanged. The downtime for exchanging a replaceable engine system component may according to one example embodiment be directly coupled to the complexity of exchanging said replaceable engine system component.

According to at least one example embodiment, the exchange of a replaceable engine system component is defined as removing said replaceable engine system component and installing a new corresponding replaceable engine system component. However, the definition of the exchange of a replaceable engine system component may alternatively include removing said replaceable engine system component, performing maintenance on said replaceable engine system component (to improve its deterioration status) and re-installing said replaceable engine system component subsequent to the performed maintenance.

According to at least one example embodiment, the component exchangeability data includes the amount of $CO_2$ equivalents associated with exchanging the corresponding replaceable engine system component.

The $CO_2$ equivalents associated with exchanging the corresponding replaceable engine system component may be referred to as greenhouse gas (GHG) emissions, or the carbon footprint associated with exchanging the corresponding replaceable engine system component. The $CO_2$ equivalents, GHG emissions, or carbon footprint, may be determined in accordance with ISO 14067. ISO 14067 defines the principles, requirements, and guidelines for the quantification of the carbon footprint of products. For example, quantification of the $CO_2$ equivalents or GHG emissions associated with the life cycle stages of the replaceable engine system component being subject to exchange, beginning with resource extraction and raw material sourcing and extending through the production, use and end-of-life phases of the component may be asserted. Thus, the exchange of the replaceable engine system component out of a plurality of replaceable engine system components which results in the lowest amount of $CO_2$ equivalents for the modifications of the engine system in relation to the overall emission reducing efficiency of the engine system may be identified in an efficient manner.

According to at least one example embodiment, the component exchangeability data includes at least: costs associated with exchanging the corresponding replaceable engine system component, and the downtime of exchanging the corresponding replaceable engine system component. That is, the replaceable engine system component to be exchanged is identified based on a known relation between: the costs and downtime associated with exchanging the replaceable engine system components, and the resulting emission reducing efficiency of a potential exchange of each one of the replaceable engine system components, and the corresponding effect on the overall emission reducing efficiency.

According to at least one example embodiment, the component exchangeability data includes at least: the amount of $CO_2$ equivalents associated with exchanging the corresponding replaceable engine system component, and the downtime of exchanging the corresponding replaceable engine system component. That is, the replaceable engine system component is identified based on a known relation between: the $CO_2$ equivalents and downtime associated with exchanging the replaceable engine system components, and the resulting emission reducing efficiency of a potential exchange of each one of the replaceable engine system components, and the corresponding effect on the overall emission reducing efficiency.

According to at least one example embodiment, the method further comprises:

providing a target for the overall emission reducing efficiency of the engine system, wherein the identification of the replaceable engine system component to exchange is performed in response to at least reach the target for the overall emission reducing efficiency of the engine system.

Hereby, the diagnosing method of the engine system is further improved. For example, sub-optimisation, and/or the selection of replaceable engine system components to exchange which lead to low, or poor, improvements of the overall emission reducing efficiency of the engine system, can be avoided. That is, the step of identifying the replaceable engine system component to exchange in response to the known relation between component exchangeability data and the resulting emission reducing efficiency of a potential exchange of the replaceable engine system component, is performed with the criterium to at least reach the target for the overall emission reducing efficiency of the engine system.

According to at least one example embodiment, the method further comprises:

providing an emission threshold of emissions out from the exhaust aftertreatment system of the engine system, wherein the identification of the replaceable engine system component to exchange is performed in response to that emissions out from the exhaust aftertreatment system are above the emission threshold.

Hereby, the diagnosing method of the engine system is further improved. Thus, initiation of the diagnosing method is only performed if the emissions out from the exhaust aftertreatment system are above the emission threshold. Hereby, unnecessary engine system diagnosis can be avoided. For example, the emission threshold may correspond to an increased emission level from the engine system, e.g. relative to an expected emission level, or an emission level associated with the normal operation of the engine system. Thus, as the effect on the overall emissions reducing efficiency is determined for a potential exchange of each one in the set of plurality of replaceable engine system components, and given the effect of the component exchangeability data of exchanging each replaceable engine system component, the identification of the replaceable engine system component to exchange which results in an emission level below the emission threshold (i.e. to bring the engine system back down to an acceptable emission level) can be achieved at the minimum effect of the component exchangeability data.

According to at least one example embodiment, the engine system comprises a plurality of sensors providing measurement data, wherein the deterioration status of each one of the replaceable engine system components is determined in response to the measurement data.

Hereby, a trustworthy source for providing data input to the deterioration status of each one of the replaceable engine system components is provided. For example, the plurality of sensor is arranged in the engine system in locations corresponding to the replaceable engine system components. Hereby, the measurement data from the plurality of sensors may better represent the status of the replaceable engine system components.

According to at least one example embodiment, determining the deterioration status of each one of the replaceable engine system components comprises:

determining a plurality of residuals by comparing the measurement data with reference data;

determining the deterioration status of each one of the replaceable engine system components using the plurality of residuals.

Hereby, an efficient way of determining the deterioration status of each one of the replaceable engine system components is provided. The reference data may e.g. comprise the expected value of the associated sensor for the corresponding replaceable engine system component having an optimal, or unaffected, deterioration status (i.e. no deterioration). Alternatively, the reference data is secondary measurement data from a secondary sensor (i.e. a sensor different to the sensor providing the measurement data). For example, two sensors arranged on opposite sides of a replaceable engine system component (i.e. upstream and downstream of the replaceable engine system component) may provide the measurement data and the reference data. Hereby, the operation capability of the replaceable engine system component may be determined, and compared to the expected result of the optimal, or unaffected, replaceable engine system component in order to determine the deterioration status. For example, the NOx conversion over an SCR catalyst may be determined by a NOx sensor arranged upstream of the SCR catalyst, and a NOx sensor arranged downstream of the SCR catalyst, and/or the NOx conversion of the SCR catalyst in relation to injected reductant (or UREA). As a further alternative, the operational capability of a replaceable engine system component may be deducted from measurement data from other sensors. For example, for a three-way catalyst, oxygen sensors arranged upstream and downstream of the three-way catalyst may be used. Moreover, the reference data may be modelled data corresponding to an agglomeration of secondary measurement data from a plurality of secondary sensors.

According to at least one example embodiment, the measurement data is input from a passive diagnostics or is input from an active diagnostics.

Thus, a trustworthy source for providing the measurement data is provided. The passive diagnostics may e.g. be performed by comparing measurement data from a sensor value with a modelled value during normal operation. The active diagnostics may e.g. be performed by activating a component in the engine system in an intended way to get a better diagnostics result, e.g. by opening and closing a valve while the measurement data from the sensor and model value is compared.

According to at least one example embodiment, the known relation between component exchangeability data and resulting emission reducing efficiency of a potential exchange of the replaceable engine system component is correlating how the emission reducing efficiency can be improved or optimized with regards to the component exchangeability data.

Hereby, an efficient way of achieving an improved or optimized emission reducing efficiency with regards to the component exchangeability data is provided.

According to at least one example embodiment, the identification of the replaceable engine system component to exchange comprises comparing the overall emission reducing efficiency with regards to the component exchangeability data for the potential exchange of each one of the replaceable engine system components, wherein the exchange of the replaceable engine system component resulting in the best overall emission reducing efficiency with regards to the component exchangeability data is identified for exchange.

Thus, by comparing the results for a potential exchange of each one of the replaceable engine system components, the identification of the particular replaceable engine system component to be exchanged resulting in the best, or optimal, overall emission reducing efficiency with regards to the component exchangeability data can be achieved. That is, by exchanging a replaceable engine system component in comparison with a potential exchange for each one of the replaceable engine system components, the overall emission reducing efficiency is improved or optimized with regards to the component exchangeability data.

According to at least one example embodiment, the complete engine system is included in the diagnostic method. For example, each replaceable engine system component in the engine system is subject to a potential exchange with the subsequent impact on the overall emission reducing efficiency with regards to the component exchangeability data.

According to a second aspect of the invention, a computer program comprising program code means for performing the method of the first aspect of the invention, when the program is run on a computer, is provided.

Such computer program may e.g. be implemented in an electronic control unit, ECU, of the vehicle.

According to a third aspect of the invention, a computer readable medium carrying a computer program comprising program code means for performing the method of the first aspect of the invention, when said computer program is run on a computer, is provided.

According to a fourth aspect of the invention, a controlling apparatus for diagnosing an engine system comprising an engine and an exhaust aftertreatment system for reducing emissions of the exhaust gases from the engine, the engine system comprising a plurality of replaceable engine system components, is provided. The controlling apparatus is configured to:

maintain a database with component data, the component data comprising, for each one of the replaceable engine system components, a deterioration efficiency parameter correlating the deterioration status of the replaceable engine system component to emission reducing efficiency, and a utility component parameter comprising component exchangeability data;
  determine the deterioration status of each one of the replaceable engine system components;
  estimate the emission reducing efficiency for each one of the replaceable engine system components in response to the determined deterioration status and the deterioration efficiency parameter;
  based on a known relation between component exchangeability data and the resulting emission reducing efficiency of a potential exchange of the replaceable engine system component, identify a replaceable engine system component to exchange.

According to a fifth aspect of the invention, a vehicle comprising a controlling apparatus according to the fourth aspect of the invention is provided.

Effects and features of the second to fifth aspects of the invention are largely analogous to those described above in connection with the first aspect of the invention. Embodiments mentioned in relation to the first aspect of the invention are largely compatible with the second to fifth aspects of the invention.

It should be understood that the method according to the first aspect of the invention, the computer program according to the second aspect of the invention, the computer readable medium according to the third aspect of the invention, and the controlling apparatus according to the fourth aspect of the invention, typically are adapted for an engine system of a vehicle.

The order of the method steps described in the present disclosure is not constrained to that described in the first aspect of the invention. One or several of the steps could switch places or occur in a different order without departing from the scope of the invention. However, according to at least one example embodiment, the method steps are performed in the consecutive order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
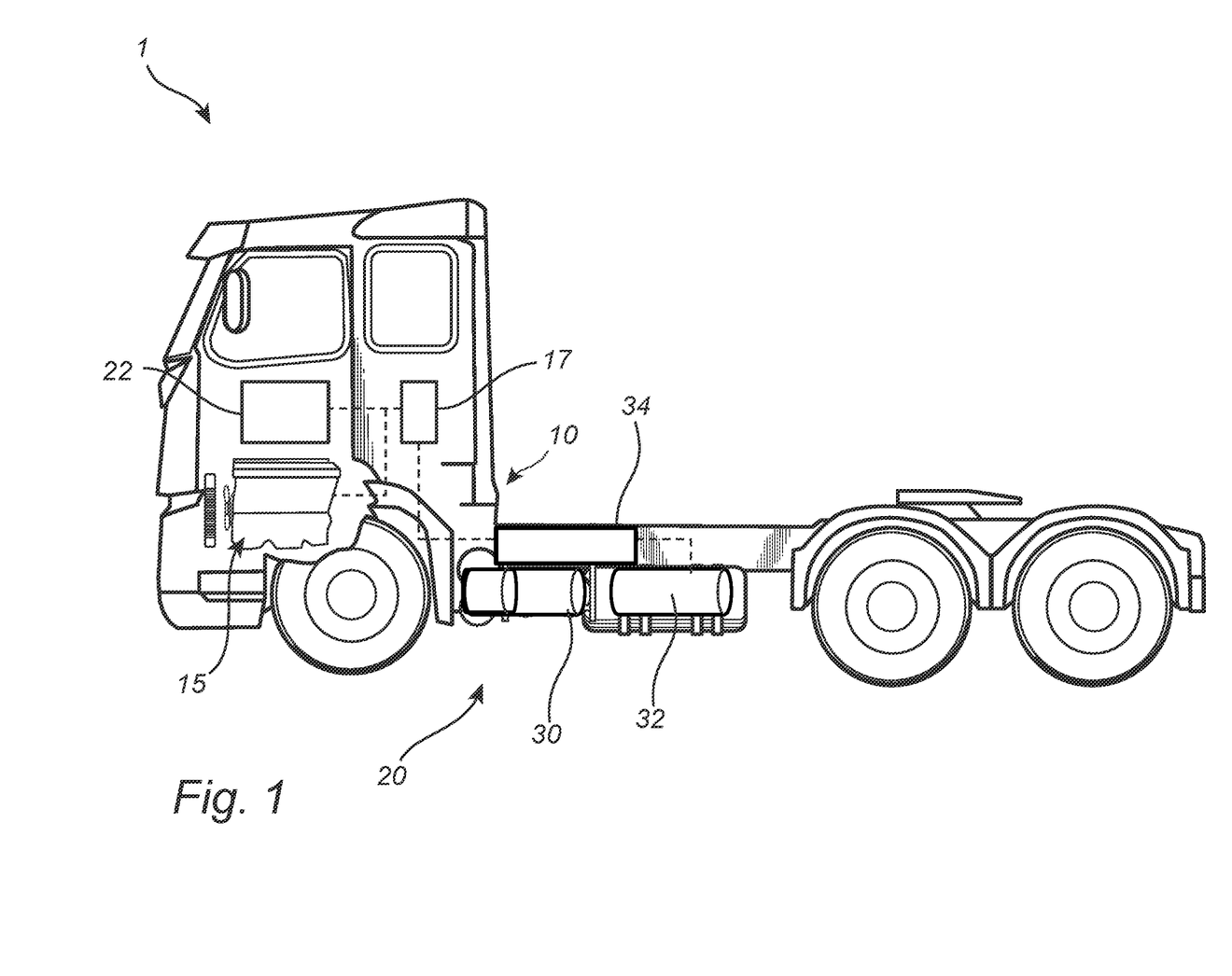
FIG. 1 is a schematic side view of a vehicle having an engine system comprising an engine and an exhaust aftertreatment system for reducing emissions of the exhaust gases from the engine, in accordance with an example embodiment of the invention.

With reference to FIG. 1 a vehicle 1, here embodied as a heavy duty truck 1, comprising an engine system 10 including an engine 15 and an exhaust aftertreatment system, EATS 20 is disclosed. However, the engine system 10 may as well be implemented in other types of vehicles, such as in busses, light-duty trucks, passenger cars, marine applications etc having similar engine systems. The vehicle 1 of FIG. 1 is a hybrid vehicle 1 comprising an engine 15, which in this embodiment is an internal combustion engine 15, such as a diesel engine or hydrogen engine, and an electric machine 22. The internal combustion engine 15 is powered by a liquid or gaseous fuel, such as a diesel fuel or hydrogen, typically comprised in a fuel tank (not shown) and the electric machine 22 is powered by electricity supplied from at least one energy storage or transformation device, e.g. a battery or a fuel cell. The internal combustion engine 15 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the internal combustion engine 15 alone, the electric machine 22 alone, or by the internal combustion engine 15 together with the electric machine 22. Moreover, the vehicle 1 comprises a controlling apparatus 17 configured to control the operation of the engine system 10 as will be described in more detail below.

In FIG. 1, at least the internal combustion engine 15 is comprised in the engine system 10, the engine system 10 further comprising the EATS 20 having at least an SCR catalyst 32. The SCR catalyst 32 is arranged and configured to convert nitrogen oxides, also referred to as NOx, with the aid of a catalyst, into diatomic nitrogen, N2, and water, H2O, and potentially carbon dioxide, CO2. The EATS 20 further comprises a reductant dosing system 34 configured to provide a reductant, typically anhydrous ammonia, aqueous ammonia or urea solution (commonly referred to as reductant in the present disclosure), to the SCR catalyst. Hereby, the reductant can be absorbed onto the catalyst in the SCR catalyst 32. Typically, the EATS 20 comprises at least one more emission reducing component 30, such as an oxidation catalyst and/or a particulate filter, and/or comprises components facilitating the operation of the emission reducing components, such as valves and pumps or the like. Such engine system is further exemplified with reference to FIG. 2.

Figure 2:
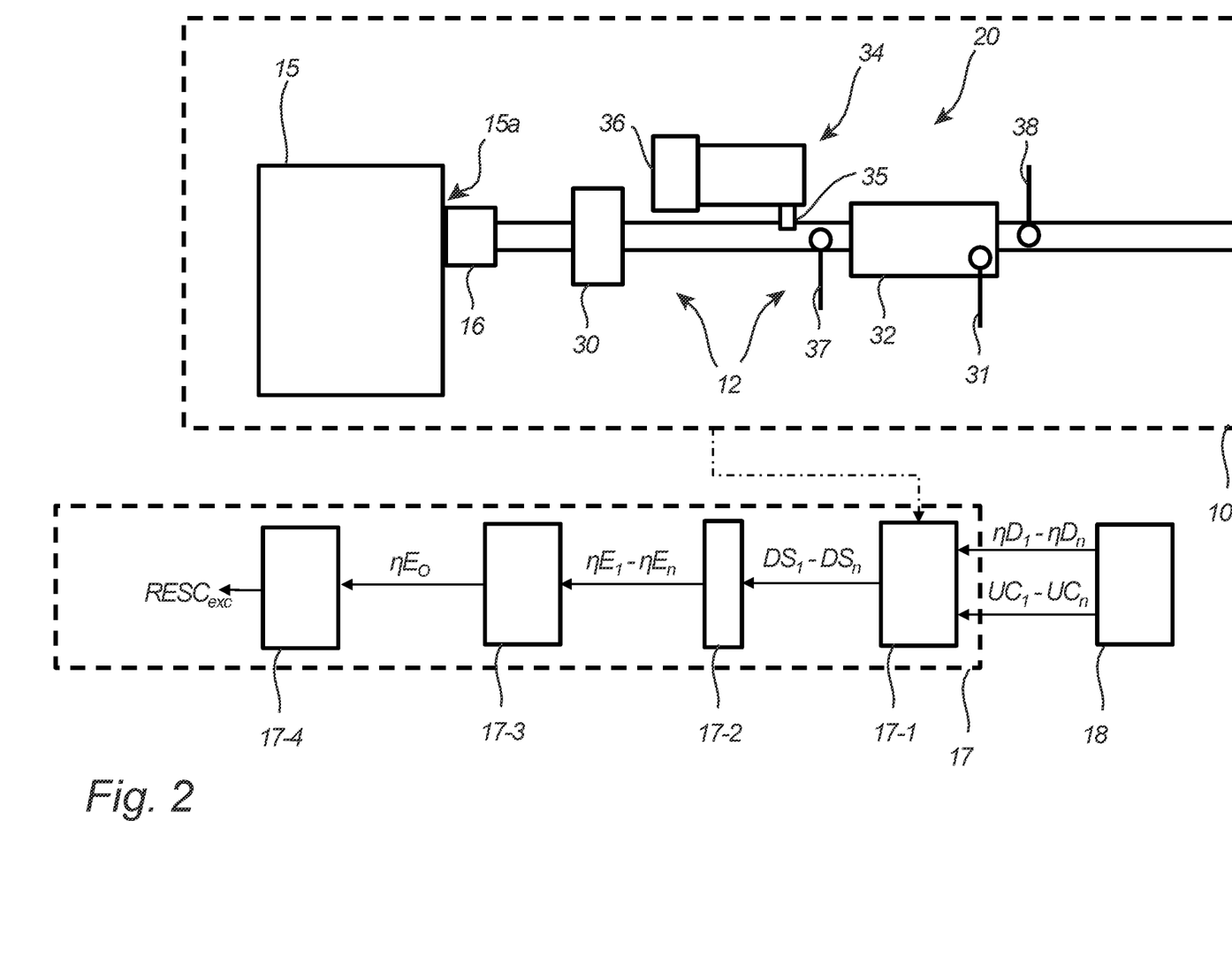
FIG. 2 is a schematic view of an engine system comprising a plurality of replaceable engine system components, in accordance with example embodiments of the invention.

FIG. 2 discloses the engine system 10 of vehicle 1 of FIG. 1 in more detail. The engine system 10 comprises, as already described with reference to FIG. 1, an internal combustion engine 15 and an EATS 20 having an SCR catalyst 32 and a reductant dosing system 34, and a controlling apparatus 17 which is configured to control the operation of the engine system 10. It should however be mentioned that the controlling apparatus 17 may be provided outside of the engine system 10 and instead being comprised in another part of the vehicle or alternatively, outside of the vehicle in e.g. a cloud based server.

The reductant dosing system 34 of FIG. 2 comprises a pressurising device 36 in the form of a dosing pump which is configured to pressurize the reductant in the reductant dosing system 34 up to at least a predefined operating pressure. That is, the reductant is typically held within a closed container of the reductant dosing system 34, and the pressurising device 36 is configured to pressurise the reductant in the closed container to the predefined operating pressure. The reductant dosing system 34 may further comprise an injector 35 configured to inject the pressurised reductant upstream of the SCR catalyst 32 for providing the reducing agent, typically ammonia, to the SCR catalyst 32 for the conversion of NOx as previously described.

The EATS 20 of FIG. 2 further comprises a temperature sensor 31 arranged to measure the temperature of the SCR catalyst 32. The engine system 10 may optionally comprise one or more emission reducing modules 30, being e.g. an oxidation catalyst (e.g. a diesel oxidation catalyst, DOC) and/or a particulate filter (e.g. a diesel particulate filter, DPF). The emission reducing module 30 is in the embodiment of FIG. 2 arranged upstream of the SCR catalyst 32. Moreover, NOx sensors 37, 38 are arranged on opposite sides of the SCR catalyst 32 by that a first NOx sensor 37 is arranged upstream of the SCR catalyst 32 and a second NOx sensor 38 is arranged downstream of the SCR catalyst 32. Furthermore, an exhaust gas recirculation, EGR, unit 16 is schematically shown at the engine outlet 15a. The EGR unit 16 typically comprises an EGR valve and an EGR cooler. The EGR unit 16 is configured to recirculate a small portion of the exhaust gases from the engine outlet 15a to an inlet, or a combustion chamber, of the engine 15. Hereby, the combustion temperature is lowered resulting in a reduced amount of NOx in the engine exhaust.

The various components of the engine system 10 of FIG. 2 may be exchanged, e.g. due to failure or insufficient performance. Such components are here referred to as replaceable engine system components 12, and comprises in the example of FIG. 2 the emission reducing components, such as the EGR unit 16, the emission reducing module 30 and the SCR catalyst 32, but also the components facilitating the operation of the emission reducing components, such as the reductant dosing system 34 and corresponding pressurising device 36 and injector 35. Thus, each one of the replaceable engine system components 12 of the engine system 10 may be exchanged and replaced by a new corresponding replaceable engine system component, or may be removed, subject to maintenance and re-installed into the engine system 10.

The functionality, or operational status, of each one of the replaceable engine system components 12 correlates to the overall emission reducing efficiency of the engine system 10. Thus, if each one of the replaceable engine system components 12 functions, or operates, as intended (or ideally), the overall emission reducing efficiency of the engine system 10 is optimised (typically as high as possible given the circumstances). However, each one of the replaceable engine system components 12 is subject to deterioration due to e.g. wear or aging. The deterioration of each one of the replaceable engine system components 12 may be defined by a deterioration status (e.g. based on how deteriorated a certain replaceable engine system component is compared to its undeteriorated state). Such deterioration status may furthermore be correlated to the emission reducing efficiency of the particular replaceable engine system component in a deterioration efficiency parameter. Thus, for each one of the replaceable engine system components 12, the deterioration efficiency parameters correlate the deterioration status of the replaceable engine system component to the emission reducing efficiency of such replaceable engine system component. Such correlation may e.g. be based on a known correlation of the deterioration status and the emission reducing efficiency for each one of the replaceable engine system components. Typically, a worse deterioration status is linked to a low emission reducing efficiency. The deterioration efficiency parameter may be determined in response to usage history, wear pattern, premature failure indicators, known quality problems, and more, for the corresponding replaceable engine system components 12. Moreover, the deterioration efficiency parameter may at least partly be determined in response to measurement data, e.g. from the temperature sensor 31, or the first and/or second NOx sensor 37, 38.

Thus, by exchanging one or more of the replaceable engine system components 12, the overall emission reducing efficiency of the engine system 10 can be improved. However, as the exchangeability of the different replaceable engine system components 12 typically varies, it is not always a straightforward task to determine which of the replaceable engine system components 12 to exchange.

For such reasons, the controlling apparatus 17 of the engine system 10 of FIG. 2 is configured in communication with a database 18 comprising component data. The component data comprising for each one of the replaceable engine system components 12, the previously described deterioration efficiency parameter correlating the deterioration status of the replaceable engine system component to emission reducing efficiency, and a utility component parameter comprising component exchangeability data. The component exchangeability data may e.g. correspond to, or include, the downtime of exchanging the corresponding replaceable engine system component 12. Additionally or alternatively, the component exchangeability data may correspond to, or include, the amount of $CO_2$ equivalents associated with exchanging the corresponding replaceable engine system component 12. According to another example, the component exchangeability data may e.g. correspond to, or include, the costs associated with exchanging the corresponding replaceable engine system component 12. Hereby, the exchange of at least one replaceable engine system component out of a plurality of replaceable engine system components 12 may be determined with regards to the deterioration efficiency parameter and various component exchangeability data of the utility component parameter.

In the following, the component exchangeability data is assumed to correspond to the downtime of exchanging the corresponding replaceable engine system component 12 of the engine system 10. However, the component exchangeability data may additionally or alternatively comprise at least one of the two other alternatives mentioned above. Moreover, the number of replaceable engine system components 12 is n, wherein n is any integer higher than 1. The various parameters are thus referred to with the suffix 1-n. In order to perform a diagnosis of the engine system 10 with the purpose of identifying which replaceable engine system component 12 to exchange, the controlling apparatus 17 is configured to:

maintain the database 18 with component data as previously described, the component data comprising, for each one 1-n of the replaceable engine system components 12, a deterioration efficiency parameter $\eta D1$-$\eta Dn$ correlating the deterioration status DS of the replaceable engine system component to emission reducing efficiency $\eta E$, and a utility component parameter UC1-UCn comprising component exchangeability data CE1-CEn related to downtime of exchanging the corresponding replaceable engine system component 12;

determine the deterioration status $DS_1$-$DS_n$ of each one 1-n of the replaceable engine system components 12;

estimate the emission reducing efficiency $\eta E1$-$\eta En$ for each one 1-n of the replaceable engine system components 12 in response to the determined deterioration status $DS_1$-$DS_n$ and the deterioration efficiency parameter $\eta D1$-$\eta Dn$;

based on known relation between downtime CE1-CEn of exchanging the replaceable engine system components 12 and the resulting emission reducing efficiency of a potential exchange of each one 1-n of the replaceable engine system components 12, identify a replaceable engine system component to exchange, in the controlling apparatus 17 of FIG. 2 referred to as RESCexc.

In more detail, and according to at least one example embodiment, the controlling apparatus 17 may comprise four units 17-1-17-4 configured to perform the different tasks mentioned above. For example, a first unit 17-1 may be configured to receive the component data from the database 18. The first unit 17-1 may furthermore be configured to determine the deterioration status $DS_1$-$DS_n$ of each one 1-n of the replaceable engine system components 12, e.g. based on measurement data, e.g. from the temperature sensor 31, or the first and/or second NOx sensor 37, 38, or based on other data from the replaceable engine system components 12. The controlling apparatus 17 may comprise a second unit 17-2 configured to estimate the emission reducing efficiency $\eta E1$-$\eta En$ for each one 1-n of the replaceable engine system components 12 in response to the determined deterioration status $DS_1$-$DS_n$ and the deterioration efficiency parameter $\eta D1$-$\eta Dn$, provided by the first unit 17-1. The controlling apparatus 17 may furthermore comprise a third unit 17-3 configured to provide an overall emission reducing efficiency $\eta EO$ of the engine system 10 in response to the emission reducing efficiency $\eta E1$-$\eta En$ for each one 1-n of the replaceable engine system components 12 of the engine system 10. Finally, the controlling apparatus 17 may comprise a fourth unit 17-4 configured to, for each one 1-n of the replaceable engine system components 12 and based on the known relation between component exchangeability data CE1-CEn (of the utility component parameter UC1-UCn)

corresponding to the downtime of exchanging the replaceable engine system components 12, and the resulting emission reducing efficiency of a potential exchange of the replaceable engine system component, identify the replaceable engine system component to exchange RESCexc.

Thus, the exchange of the replaceable engine system component RESCexc out of a plurality of replaceable engine system components 12 which results in the most time-efficient modifications of the engine system 10 in relation to the overall emission reducing efficiency $\eta EO$ is identified in an efficient manner. Typically, the most time-efficient exchange of the replaceable engine system component RESCexc leading to the highest overall emission reducing efficiency $\eta EO$ is identified.

A method of diagnosing an engine system comprising an engine and an exhaust aftertreatment system for reducing emissions of the exhaust gases from the engine will now be described in detail with reference to the flow chart of FIG. 3. The engine system comprises a plurality of replaceable engine system components, e.g. as the engine system 10 of FIGS. 1 and 2.

In a step S10, e.g. being a first step S10, a database with component data is maintained. The component data comprises, for each one of the replaceable engine system components, a deterioration efficiency parameter correlating the deterioration status of the replaceable engine system component to emission reducing efficiency, and a utility component parameter comprising component exchangeability data. For example, the component data is corresponding to that described with reference to FIG. 2, i.e. the deterioration efficiency parameter $\eta D1$-$\eta Dn$, the emission reducing efficiency $\eta E$, the utility component parameter UC1-UCn comprising component exchangeability data CE1-CEn.

In a step S20, e.g. being a second step S20, the deterioration status of each one of the replaceable engine system components is determined. For example, this corresponds to the deterioration status DS1-DSn described with reference to FIG. 2. Moreover, as shown in FIG. 2, the engine system may comprise a plurality of sensors providing measurement data, such as temperature sensor 31, and the first and second NOx sensors 37, 38. The measurement data may be input from a passive diagnostics or be input from an active diagnostics. Thus, the deterioration status of each one of the replaceable engine system components may be determined in response to the measurement data. Moreover, the step S20 may comprising the following sub-steps for determining the deterioration status of each one of the replaceable engine system components comprises. In sub-step S22, a plurality of residuals by comparing the measurement data with reference data is determined. The reference data may e.g. be secondary measurement data from a secondary sensor (i.e. a sensor different to the sensor providing the measurement data). For example, the first NOx sensor 37 of the engine system 10 of FIG. 2 corresponds to the sensor providing the measurement data, and the second NOx sensor 38 of the engine system 10 of FIG. 2 corresponds to the secondary sensor providing the reference data. Thus, the first and second NOx sensors 37, 38 provided upstream and downstream of the SCR catalyst 32 may provide the measurement data and the reference data for a residual evaluating the SCR catalyst 32 for being the replaceable engine system component to exchange. In a subsequent sub-step S24, the deterioration status of each one of the replaceable engine system components may be determined using the plurality of residuals. For example, the deterioration status of the SCR catalyst 32 may be determined by the above described residual evaluating the SCR catalyst 32.

In a step S30, e.g. being a third step S30, the emission reducing efficiency is estimated for each one of the replaceable engine system components in response to the determined deterioration status and the deterioration efficiency parameter. For example, the emission reducing efficiency $\eta E1$-$\eta En$, the determined deterioration status $DS_1$-$DS_n$, and the deterioration efficiency parameter $\eta D1$-$\eta Dn$ are determined as described with reference to FIG. 2.

In a step S40, e.g. being fourth step S40, a replaceable engine system component to exchange is identified based on a known relation between component exchangeability data and the resulting emission reducing efficiency of a potential exchange of the replaceable engine system component. For example, the known relation between component exchangeability data and the resulting emission reducing efficiency is correlating how the emission reducing efficiency is improved or optimized with regards to the component exchangeability data. Typically, the identification of the replaceable engine system component to exchange is performed by comparing the overall emission reducing efficiency with regards to the component exchangeability data for the potential exchange of each one of the replaceable engine system components. The exchange of the replaceable engine system component resulting in the best overall emission reducing efficiency with regards to the component exchangeability data is then identified for exchange.

For example, the component exchangeability data is the downtime CE1-CEn associated with exchanging each one of the replaceable engine system components as described with reference to FIG. 2. However, the component exchangeability data may additionally or alternatively include costs associated with exchanging the corresponding replaceable engine system component, and/or include the amount of $CO2$ equivalents associated with exchanging the corresponding replaceable engine system component.

In a sub-step S45 to step S40 of identifying a replaceable engine system component to exchange, a target for the overall emission reducing efficiency of the engine system is provided. Hereby, the identification of the replaceable engine system component to exchange may be performed in response to at least reach the target for the overall emission reducing efficiency of the engine system. Hereby, sub-optimisation, and/or the selection of a replaceable engine system component to exchange which lead to low, or poor, improvements of the overall emission reducing efficiency, can be avoided In a step S15, typically performed prior to the step S20 of determining the deterioration status of each one of the replaceable engine system components, an emission threshold of emissions out from the exhaust aftertreatment system of the engine system is provided. Hereby, the subsequent steps of the method, at least steps S20, S30 and S40 may be performed in response to that emissions out from the exhaust aftertreatment system are above the emission threshold. Thus, initiation of the diagnosing method is only performed if the emissions out from the exhaust aftertreatment system are above the emission threshold. Hereby, unnecessary engine system diagnosis can be avoided.

Figure 3:
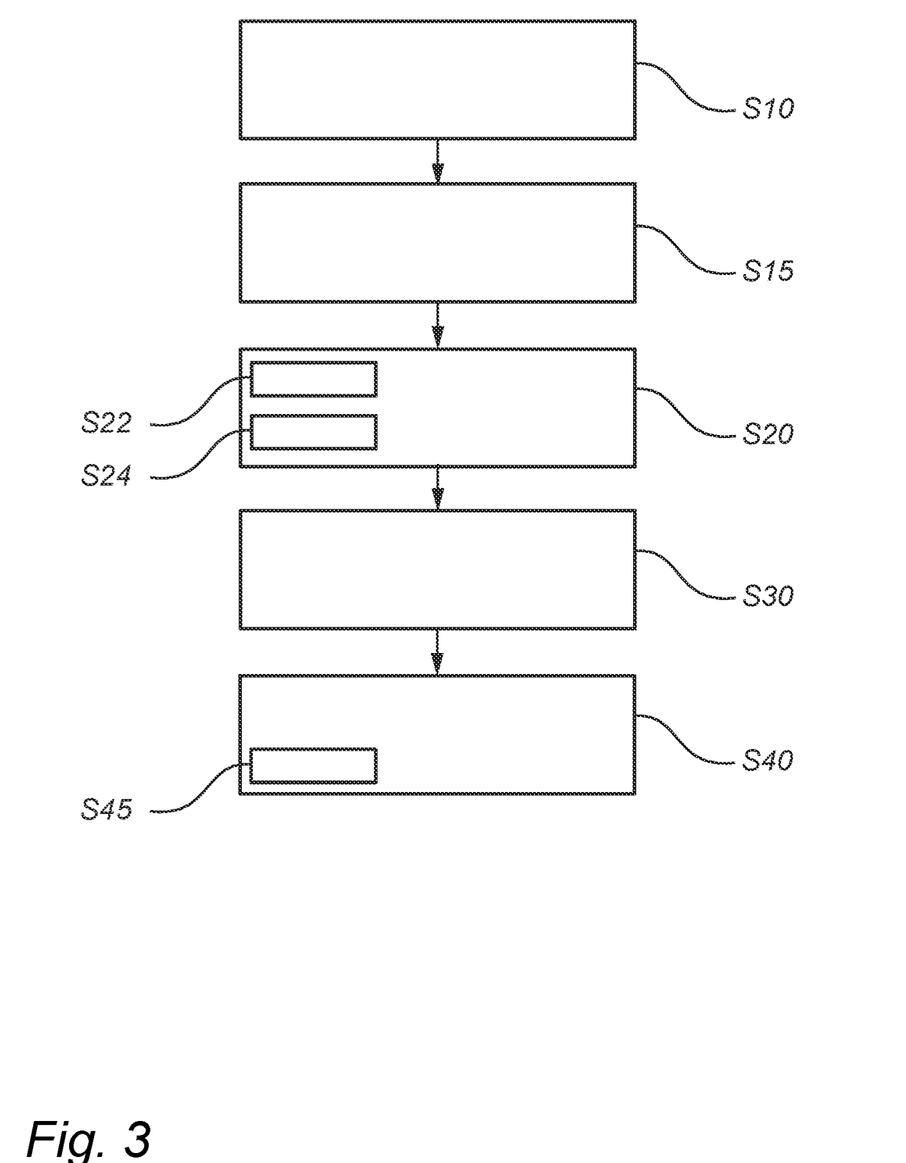
FIG. 3 is a flowchart illustrating the steps of a method in accordance with example embodiments of the invention.

The vehicle 1 of FIG. 1, and the engine system 10 of FIG. 2, may be subject to the method described with reference to FIG. 3. For example, the controlling apparatus 17 may be configured to perform the method described with reference to FIG. 3. The controlling apparatus 17 may comprise a processing apparatus or be referred to as a processing apparatus. For example, the controlling apparatus may be configured to diagnose the engine system by being configured to:

maintain a database with component data, the component data comprising, for each one of the replaceable engine system components, a deterioration efficiency parameter correlating the deterioration status of the replaceable engine system component to emission reducing efficiency, and a utility component parameter comprising component exchangeability data, corresponding to step S10 of FIG. 3;

determine the deterioration status of each one of the replaceable engine system components, corresponding to step S20 of FIG. 3;

estimate the emission reducing efficiency for each one of the replaceable engine system components in response to the determined deterioration status and the deterioration efficiency parameter, corresponding to step S30 of FIG. 3; and based on a known relation between component exchangeability data and the resulting emission reducing efficiency of a potential exchange of the replaceable engine system component, identify a replaceable engine system component to exchange, corresponding to step S40 of FIG. 3.

The order of the steps in the method of FIG. 3 described in the foregoing embodiments is merely an example and is not necessarily limited to the order described. The order of steps may be switched, unless the steps are dependent on each other, and parts of some steps may be omitted, e.g. the described sub-steps. In case one or more of sub-steps are omitted, renaming of the sub-steps is preferably carried out.

It is to be understood that the present invention is not limited to the embodiments described above and illustrated in the drawings; rather, the skilled person will recognize that many changes and modifications may be made within the scope of the appended claims. For example, the method of the invention may be referred to as a method for determining the emission reducing efficiency of the engine system.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

It should be understood that the controlling apparatus 17 may not need to be one single unit, but its functionality may be divided into different, separate, control units (as e.g. units 17-1-17-4 as exemplified in FIG. 2), and some functionality may naturally be performed as calculations in a remote server or by cloud computing. The database 18 may for example be part of the controlling apparatus, or be located in a remove server, such as e.g. in a cloud based server. Those skilled in the art will also appreciate that the controlling apparatus 17 may refer to a combination of analog and digital circuits, and/or one or more processors configured with program software and/or firmware, e.g. stored in a memory, that when executed by the one or more processors perform the one or more of the steps described in conjunction with FIG. 3. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Any standard or qualifications (such as an ISO standard) mentioned in the present application are to be based on instructions valid on the date of priority of the present application.

The invention claimed is:

1. A method of diagnosing an engine system comprising an engine and an exhaust aftertreatment system for reducing emissions of the exhaust gases from the engine, the engine system comprising a plurality of replaceable engine system components, the method comprising:

maintaining a database with component data, the component data comprising, for each one of the replaceable engine system components, a deterioration efficiency parameter correlating the deterioration status of the replaceable engine system component to emission reducing efficiency, and a utility component parameter comprising component exchangeability data;

determining the deterioration status of each one of the replaceable engine system components;

estimating the emission reducing efficiency for each one of the replaceable engine system components in response to the determined deterioration status and the deterioration efficiency parameter; and based on known relation between component exchangeability data and the resulting emission reducing efficiency of a potential exchange of the replaceable engine system component, identifying a replaceable engine system component to exchange.

2. The method according to claim 1, wherein the component exchangeability data includes costs associated with exchanging the corresponding replaceable engine system component.

3. The method according to claim 1, wherein the component exchangeability data includes the downtime of exchanging the corresponding replaceable engine system component.

4. The method according to claim 1, wherein the component exchangeability data includes the amount of CO2 equivalents associated with exchanging the corresponding replaceable engine system component.

5. The method according to claim 1, further comprising:
providing a target for the overall emission reducing efficiency of the engine system, wherein the identification of the replaceable engine system component to exchange is performed in response to at least reach the target for the overall emission reducing efficiency of the engine system.

6. The method according to claim 1, further comprising:
providing an emission threshold of emissions out from the exhaust aftertreatment system of the engine system, wherein the identification of the replaceable engine system component to exchange is performed in response to that emissions out from the exhaust aftertreatment system are above the emission threshold.

7. The method according to claim 1, wherein the engine system comprises a plurality of sensors providing measurement data, and wherein the deterioration status of each one of the replaceable engine system components is determined in response to the measurement data.

8. The method according to claim 7, wherein determining the deterioration status of each one of the replaceable engine system components comprises:
determining a plurality of residuals by comparing the measurement data with reference data;
determining the deterioration status of each one of the replaceable engine system components using the plurality of residuals.

9. The method according to claim 8, wherein the measurement data is input from a passive diagnostics or is input from an active diagnostics.

10. The method according to claim 1, wherein the known relation between component exchangeability data and the resulting emission reducing efficiency of a potential exchange of the replaceable engine system component is correlating how the emission reducing efficiency can be improved or optimized with regards to the component exchangeability data.

11. The method according to claim 10, wherein the identification of the replaceable engine system component to exchange comprises comparing the overall emission reducing efficiency with regards to the component exchangeability data for the potential exchange of each one of the replaceable engine system components, wherein the exchange of the replaceable engine system component resulting in the best overall emission reducing efficiency with regards to the component exchangeability data is identified for exchange.

12. A computer program comprising program code for performing the method of claim 1, when the program is run on a computer.

13. A computer readable medium carrying a computer program comprising program code for performing the method of claim 1, when the program code is run on a computer.

14. A controlling apparatus for diagnosing an engine system comprising an engine and an exhaust aftertreatment system for reducing emissions of the exhaust gases from the engine, the engine system comprising a plurality of replaceable engine system components, the controlling apparatus being configured to:
maintain a database with component data, the component data comprising, for each one of the replaceable engine system components, a deterioration efficiency parameter correlating the deterioration status of the replaceable engine system component to emission reducing efficiency, and a utility component parameter comprising component exchangeability data;
determine the deterioration status of each one of the replaceable engine system components;
estimate the emission reducing efficiency for each one of the replaceable engine system components in response to the determined deterioration status and the deterioration efficiency parameter;
based on a known relation between component exchangeability data and the resulting emission reducing efficiency of a potential exchange of the replaceable engine system component, identify a replaceable engine system component to exchange.

15. A vehicle comprising a controlling apparatus according to claim 14.

* * * * *